Oct. 17, 1939.   L. W. NYE   2,176,271
MILK-SHAKER ATTACHMENT
Filed Oct. 21, 1938
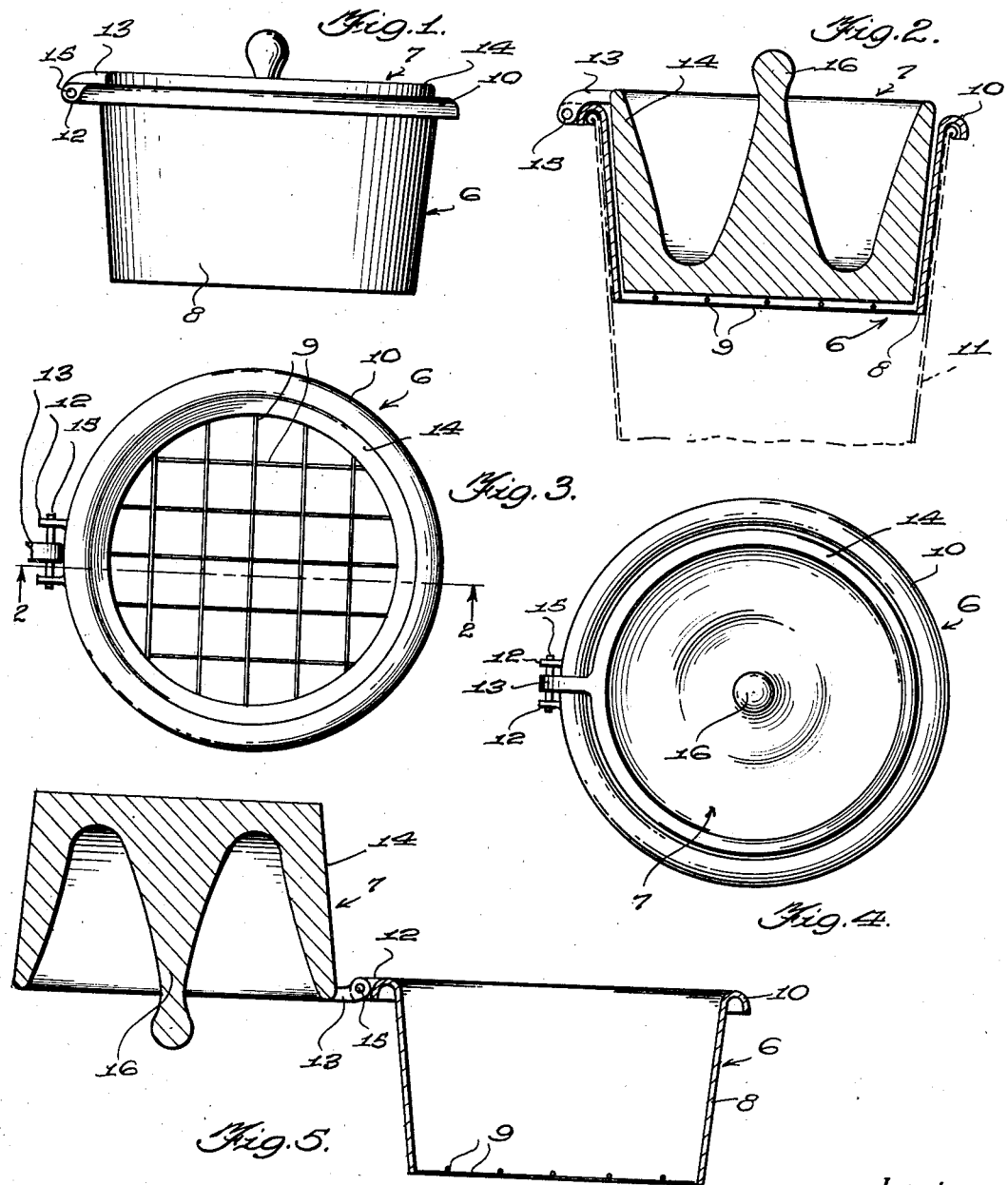
Inventor
LOUIS W. NYE,
By Clarence A. O'Brien
and Hyman Berman
Attorneys Patented Oct. 17, 1939

2,176,271

UNITED STATES PATENT OFFICE 2,176,271

MILK-SHAKER ATTACHMENT

Louis W. Nye, Lava Hot Springs, Idaho

Application October 21, 1938, Serial No. 236,365

1 Claim. (Cl. 107—48)

My invention relates to an attachment in the form of a temporary insert principally adapted for use in connection with shaker cans and receptacles of the type used at soda fountains, and the purpose of the invention is to provide simple and economical means for squashing a scoop of ice cream into relatively smaller portions to facilitate mixing the ice cream with the liquid when the attachment has been removed and the charged shaker is placed on the stand of the customary electric stirrer or agitating device.

There is apparently recognized need for some means to reduce the chunks of dipped ice cream into relatively smaller portions to facilitate mixing with the liquid. Thus, in keeping with the principles of this invention, a mixing cup attachment of the type disclosed and claimed is aptly fitted for the purposes intended. Its use is calculated to save time since by breaking up the scoop or chunk of ice cream into comparatively small portions so that less resistance is encountered by the rotary or other type of electric stirrer employed. Furthermore, because of the thorough mixing of ice cream with the liquid, a more satisfying, well beaten and smoother drink and perhaps one of seeming larger quantity is procurable.

Briefly, the preferred embodiment of the invention is in the form of a tapered grid-equipped collar, the same having a supporting lip to engage over the rim of the conventional mixing cup, there being a hinged plunger provided to forcibly thrust or squeeze the scoop of ice cream through the reducing grid.

Other features and advantages will become more readily apparent from the following description and drawing.

In the drawing:

Figure 1 is a side or edge elevational view of the attachment constructed in accordance with the principles of this invention.

Figure 2 is a section on the line 2—2 of Figure 3.

Figure 3 is a top plan view with the plunger member partly removed.

Figure 4 is a top plan view of Figure 1.

Figure 5 is a view similar to Figure 2 showing the plunger member in its normal open position.

Referring to the drawing by distinguishing reference numerals, it will be observed that one unit is indicated by the numeral 6 and the companion unit by the numeral 7. The part 6 is the insert proper and comprises the tapered metal or equivalent annulus 8 with its bottom equipped with intersecting wires 9, these serving to provide the disintegrating grid or grille. The upper end of the annulus or collar is formed into an outstanding curved flange 10, this functioning as a hanger lip to take over the rim or edge of the conventional fountain-style shaker mixing cup or receptacle 11.

On one side, the suspension or hanger flange 10 is provided with outstanding parallel lugs 12 to accommodate the hinging lug 13 carried by the plug-like cover 14. In this connection it is to be observed that the lug 13 is provided with a pivot pin 15 hingedly mounted in bearings in the lugs 12. Also, the telescoping member 14 may be of wood or other equivalent light-weight material of appropriate rigidity. Manifestly, it corresponds in shape to the adapter collar 8 so that it may telescope into it as seen in Figure 2. Then too, it is provided with a central shank or extension terminating in a handle or knob as indicated at 16. This facilitates opening and closing of the lid-like member.

In describing the parts I have found it expedient and practicable to use variable terms of equivalent scope in referring to them in diversified ways. This is deemed sufficient to convey the impression that I do not desire to be restricted to exact configuration but am interested fundamentally in the utilitarian phases even though variations may be resorted to in an effort to evade what seems to be the novelty as set out in the subjoined claims.

Manifestly, the device is used as indicated in Figure 2. That is to say, it is temporarily inserted in the mixing cup 11 after the flavored milk drink has been placed therein. With the lid-like cover as shown in Figure 5, the scoop of ice cream is dumped into the unit 6. Then the lid or cover is swung closed, as shown in Figure 2, to squeeze the ice cream through the grid and to break it up into relatively small chunks.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

An ice cream reducer attachment for a shaker cup comprising a downwardly tapered annular member for fitting in the upper end of the cup, the bottom of said member being open, a grid extending across said bottom for cutting ice cream placed in the container into small pieces, the upper end of the container having an outwardly curved flange for fitting over the upper end of the cup and a plunger forming member hingedly connected to the flange of the container for swinging movement into and out of the container, said plunger member being of substantially cup shape and tapered to fit in the container to press ice cream against the grid and a handle forming part extending from the bottom of the recess formed by the cup-shaped part through the top thereof.

LOUIS W. NYE.